H. S. Robbins,
Strawberry Culture.
No. 80,012. Patented July 14, 1868.
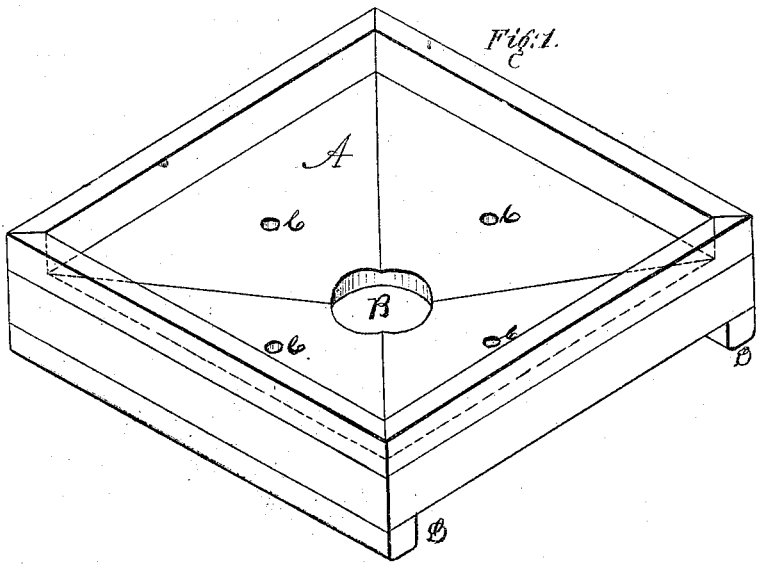
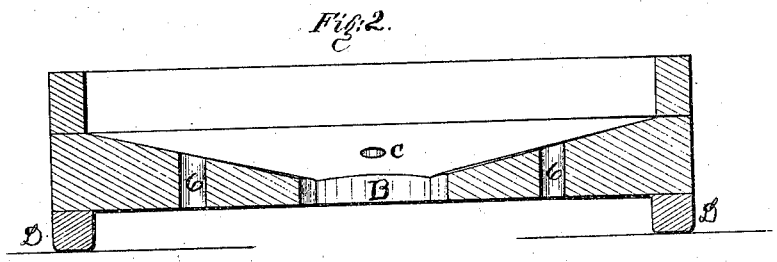
Witnesses
J. C. Smith
A. S. Bergman
Inventor
Henry S. Robbins
Chipman, Hosmer & C.
Attys

United States Patent Office.

HENRY SEYMOUR ROBBINS, OF NEWTON FALLS, OHIO.

*Letters Patent No. 80,012, dated July 14, 1868.*

IMPROVED DEVICE FOR STRAWBERRY-CULTURE.

*The Schedule referred to in these Letters Patent and making part of the same.*

TO ALL WHOM IT MAY CONCERN:

Be it known that I, HENRY SEYMOUR ROBBINS, of Newton Falls, in the county of Trumbull, and State of Ohio, have invented a new and valuable Improvement in Devices for Promoting the Culture of Strawberries; and I do hereby declare that the following is a full, clear, and exact description of the construction and operation of the same, reference being had to the annexed drawings, making a part of this specification, and to the letters and figures of reference marked thereon.

The nature of my invention consists in constructing plates of earthern of a square form, dishing downwards towards the centre, at which point I leave an opening, sufficiently large to allow for the passage upward and growth of the plant. My device also provides for raising said plate from the ground, by means of projections on the lower sides of two sides of the plate, and perforations in the plate, to allow for the circulation of air thereunder.

Figure 1 of the drawings is a representation of my device, standing on an angle of about forty degrees with the ground, and Figure 2 is a sectional view thereof.

The main plate, A, is a square dish of fire-proof clay, burned in a kiln to a blue body, and is about one foot in diameter, more or less, and about one and a half inch in thickness. It is made dishing downward toward the centre, as shown on fig. 2, in order to gather rains and dews, and convey them to the main body and stalks of the plant.

Letter B is an opening in the centre of the plate, of four or five inches in diameter, and the periphery of the same is reduced to about one-fourth of an inch in thickness, thereby forming an inclined plane from the base of the rim to said opening. The opening, B, is designed to receive the strawberry-plant.

Letters C are openings or perforations in the plate, of about one-fourth of an inch in diameter, and are designed to promote the circulation of air below the plate.

The letters D are projections of the rim of the plate downward, on two sides thereof, the object of which is to keep the plate from the ground whenever it is desirable so to do, and thereby secure proper ventilation for the plant.

My device, when applied, forms an earthen covering or pavement for the entire strawberry-bed. It saves the labor of weeding, saves the creepers from taking root, keeps the plants moistened, the fruit free from the impurities of the earth, and aids materially in bringing it to maturity.

What I claim as my invention, and desire to secure by Letters Patent, is—

A plate for strawberry-culture, constructed in the form herein shown and described, and having apertures B and C, and projections D, combined and arranged substantially as specified.

HENRY SEYMOUR ROBBINS.

Witnesses:
JOHN F. BEAVER,
PETER M. HARDEMAN.